M. H. HULLINGER.
Wheel-Cultivator.
No. 41,435.  Patented Feb. 2, 1864.
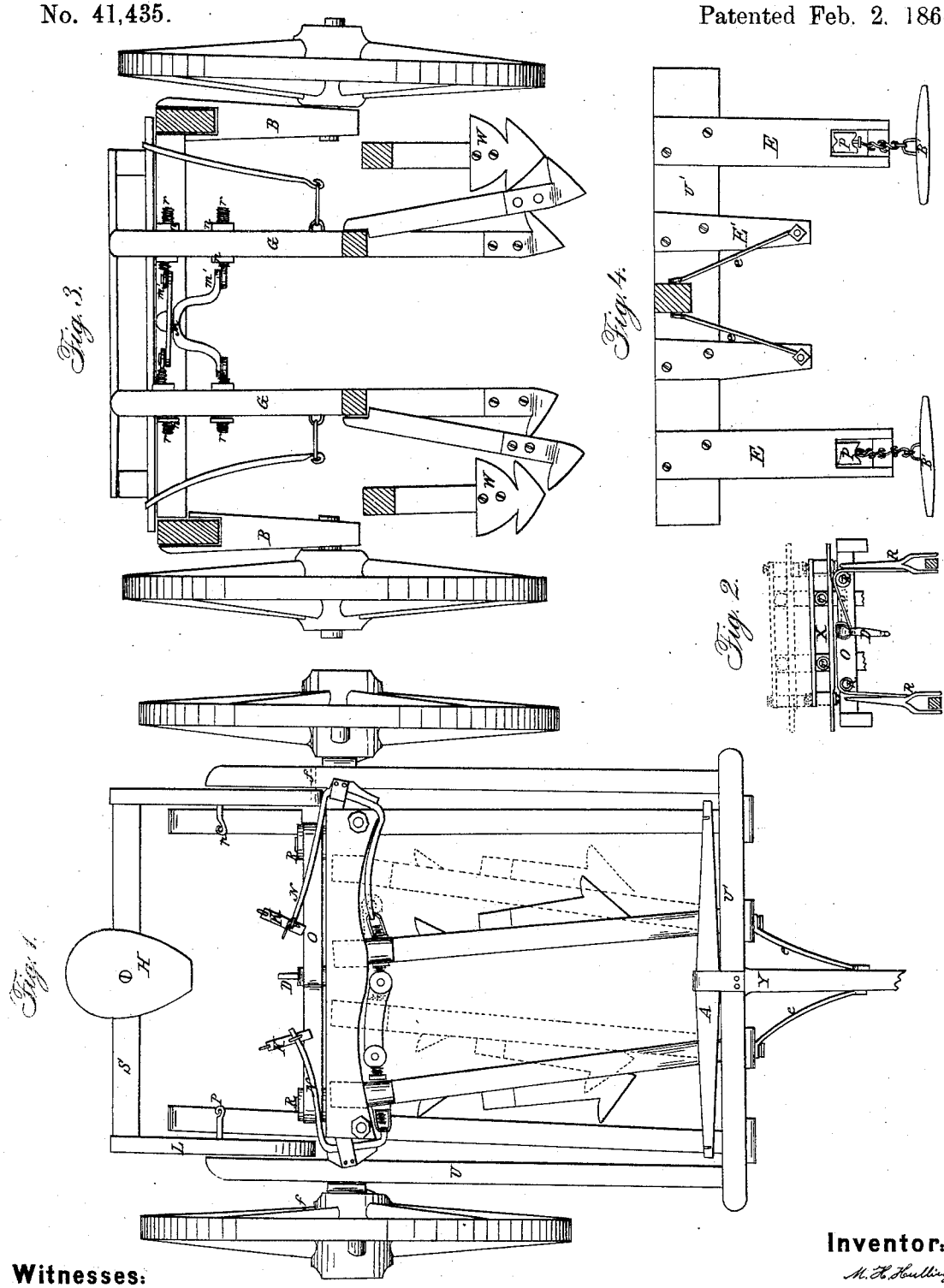
Witnesses:
D. Breed
A. Moore
Inventor:
M. H. Hullinger
Per Daniel Breed
Atty.

UNITED STATES PATENT OFFICE.

MARTIN H. HULLINGER, OF GRANVILLE, ILLINOIS.

IMPROVEMENT IN CULTIVATORS.

Specification forming part of Letters Patent No. 41,435, dated February 2, 1864.

*To all whom it may concern:*

Be it known that I, MARTIN H. HULLINGER, of Granville, in the county of Putnam and State of Illinois, have invented new and useful Improvements in Cultivators; and I do hereby declare that the following is a full and exact description thereof, reference being had to the accompanying drawings, and to the letters of reference marked thereon.

My invention consists in a peculiar construction of cultivator adapted to various kinds of cultivation, and especially to that of corn and other crops, when the same have attained the height of five feet, or more, or too great height to be successfully treated with the ordinary cultivators.

In the accompanying drawings, Figure 1 is a top view of my machine. Fig. 2 is a rear view of the windlass for elevating the shovels. Fig. 3 is a vertical and transverse section of my machine forward of the wheels. Fig. 4 is a front view of the frame detached from the wheels.

The frame U of my machine is elevated far above the axle, and is supported on standards R, which may be longer or shorter, according to the height of the wheels employed, so as to support the frame at the proper height. Upon the front piece, U', Fig. 4, of this elevated frame I fix two pendent arms, E, in the lower ends of which are pulleys P. A vibrating bar or doubletree, A, is placed on the back side of the bar U'. Chains attached to the ends of this doubletree pass under the pulley P, and afford attachment for the whiffletrees B', thus bringing the latter down to a proper height for draft, while the frame and double-tree ride high, where they can pass over tall corn or other crops without injury to the latter. The arms E and E' afford attachment to the four beams of the cultivator. The two arms E' are held by braces e, attached to the tongue or shaft Y, and the outer arms, E, are held by braces attached to the side pieces, U, of the frame.

The driver occupies an elevated seat, H, supported by a rocking shaft, S, the shaft being carried by arms L, which are pivoted at f, (dotted lines,) at their forward ends, while the rear ends are capable of being raised or lowered at pleasure, or fixed by means of pins p. As the driver sits on this elevated seat H his feet rest in stirrups K, Fig. 2, which hang upon the crooked lever N. The other end of lever N is attached by a link to the long shank G, so that the driver, by pressing a foot upon one of the stirrups, can throw shank G and its shovel away from the corn or other crop at pleasure. The two shanks G are connected by a brace or hinge, M, Fig. 3, which is double-jointed at $m\ m'$, and provided with screws $r$ and nuts $n$ for setting the shanks and shovels farther apart or nearer together at pleasure.

By means of this brace or hinge connecting the two shanks G the driver moves both shanks G to the right or to the left at the same time by the action of his foot upon the stirrup and lever N, as above described.

At the upper end of shanks G are fixed two rollers, T, Fig. 2, running on pins or pivots inserted into the shanks. These rollers ride in a slot, $x$, Fig. 2, so as to play freely to the right and to the left as the shanks are moved by the driver's feet, and yet preventing the shanks and shovels from rising or falling in relation to the frame of the machine.

On the rear of the frame, and in front of the driver's seat, is placed a crank or windlass, D, for elevating the shovels, as seen in Fig. 2. The crank D being turned the straps O, riding over pulleys R and attached to the plow-beams, raise or lower all the shovels at will.

The shovels W have wings on both sides, and are made convex in front and concave behind or below, similar to the common shovel. The other shovels correspond to the half of the double shovels W.

I do not broadly claim an elevated frame, whiffletree, or driver's seat; but I believe my peculiar arrangement of these parts is new, as such arrangement allows me to cultivate corn five or six feet high. Therefore I limit my claims to my peculiar construction of cultivators.

Having thus fully described my invention, what I claim, and desire to secure by Letters Patent of the United States, is—

1. The peculiar arrangement of the shanks G, united by the double-jointed brace M, and provided with rollers T, working in the slot $x$, substantially in the manner and for the purposes set forth.

2. The double-jointed brace M, for connecting the shanks G, thereby enabling the driver to keep the plows in place when the shanks G are five feet or more in length, substantially as set forth.

3. The combination of the rollers T and windlass D, the former operated by the driver's feet and the latter by his hands, substantially in the manner and for the purposes set forth.

4. The arms L and shaft S, for making the driver's seat adjustable, as specified.

MARTIN H. HULLINGER.

Witnesses:
 D. L. CHILD,
 JAMES L. ROBINSON.